RECORD DISC AND PLAY-BACK APPARATUS

Filed June 5, 1964 4 Sheets-Sheet 1

Colin John Mason
INVENTOR:

BY
Scrivener Parker
Scrivener & Clarke

Jan. 9, 1968 C. J. MASON 3,363,054

RECORD DISC AND PLAY-BACK APPARATUS

Filed June 5, 1964 4 Sheets-Sheet 2

Colin John Mason
INVENTOR:

BY

Scrivener Parker
Scrivener & Clarke

Jan. 9, 1968 C. J. MASON 3,363,054
RECORD DISC AND PLAY-BACK APPARATUS
Filed June 5, 1964 4 Sheets-Sheet 3
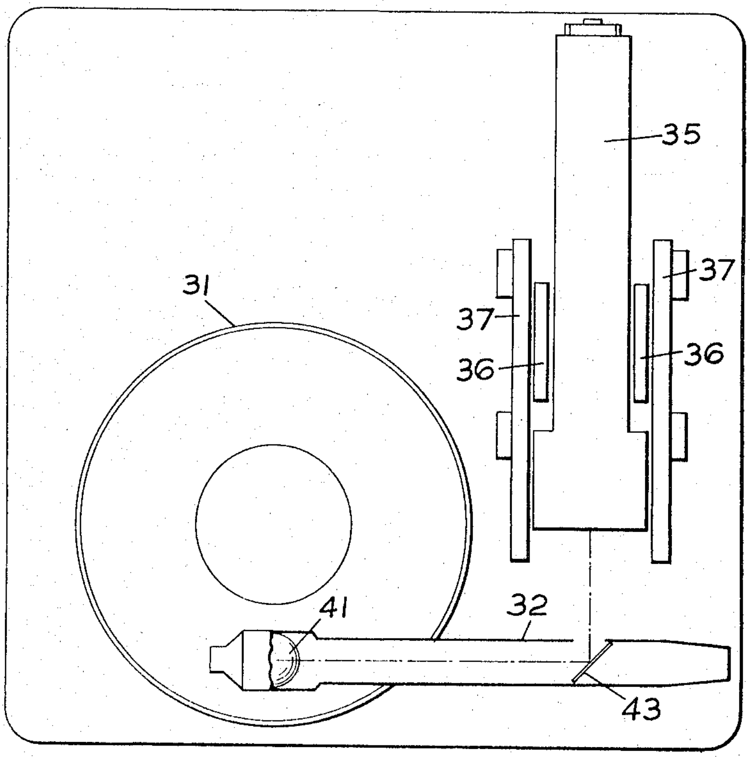
Fig. 4.
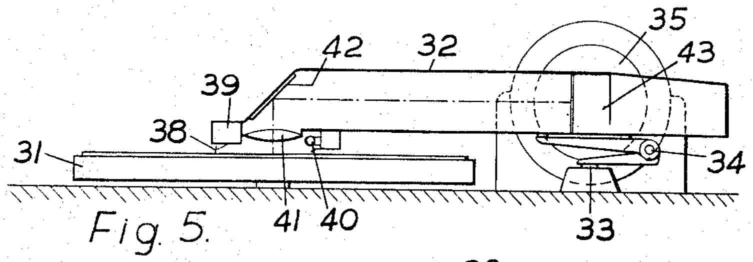
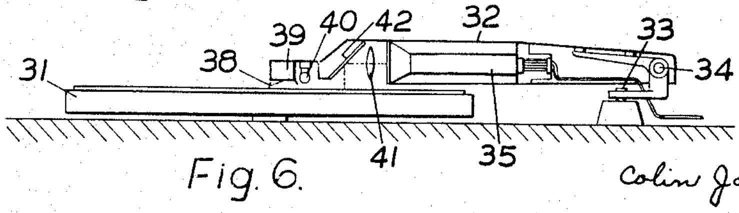
Colin John Mason
INVENTOR:
BY
Scrivener Parker
Scrivener & Clarke

RECORD DISC AND PLAY-BACK APPARATUS

Filed June 5, 1964

Colin John Mason
INVENTOR:

BY
Scrivener Parker
Scrivener & Clarke

United States Patent Office 3,363,054

Patented Jan. 9, 1968

3,363,054

RECORD DISC AND PLAY-BACK APPARATUS

Colin John Mason, Wolverhampton, England, assignor of one-fourth each to Joyce Mason, John Deryk Hoppett, and Nicholas Peter Stead, all of Wolverhampton, England Filed June 5, 1964, Ser. No. 372,877
Claims priority, application Great Britain, June 26, 1963, 25,356/63
9 Claims. (Cl. 178—6.7)

This invention relates to and has for its main object the provision of a new or improved record disc and play-back apparatus which, in conjunction with a television receiver, can be employed to reproduce in sound and vision the performances of a recording artist, or any other programme item having both sound and visual appeal or interest. A further object is to provide such a record disc from which the sound content can be reproduced alone, if desired, by an appropriate gramophone or record player equipment.

According to the invention, the record disc is characterised in that it has two spiral tracks running immediately alongside each other, one track carrying in photographically recorded form the vision or video content and the other track carrying the sound content. Preferably said other or second track is adapted also to serve as a guide track for a pick up.

The base upon which a thin photographic emulsion is applied is the record disc itself and the video content is photographically recorded thereon for photo-electric reproduction. The season for adoption of this method is that the frequencies involved for video reproduction are too high for any mechanical system to be employed, whereas photographic recordal for photo-electrical reproduction enables a far greater number of picture elements to be accommodated in an extremely small surface area or narrow track alongside the sound track on a disc of standard size.

The sound track may be recorded mechanically, photo-electrically or magnetically and be reproduced by whichever conventional means is applicable, but the mechanical recordal in a spiral groove is the most appropriate or convenient since the groove can serve as a guide for a pick-up embracing or covering both tracks.

The sound track groove can contain audio recordings in a conventional manner, while the intermediate "land" contains the photographically produced video content for reproduction by a photo-electric pick-up system of the flying spot type. Where the sound track is not mechanically recorded in a groove, a separate spiral groove to serve as a guide track for the pick-up may be provided in the record disc "interlaced" with the video track and sound track which run immediately alongside each other, or such separate guide track may be incorporated in the play-back apparatus.

The invention will now be more fully described with reference to and by the aid of the accompanying drawings, in which:

FIGS. 4 and 5 illustrate a record player deck and pick up unit in plan and elevation respectively.

FIG. 6 is a similar view to FIG. 5 but illustrates a modification in which a video pick up tube is incorporated in the pick up arm itself.

Figure 1:
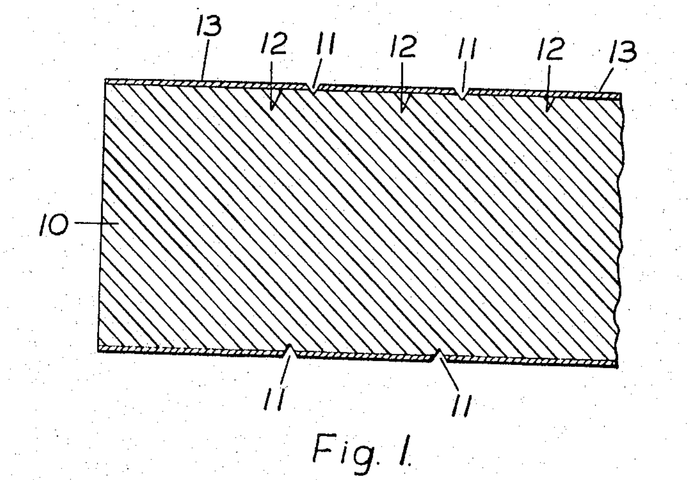
FIG. 1 is a fragmentary radial section, drawn to a large scale, of a "double-sided" record disc according to one embodiment.
Figure 2:
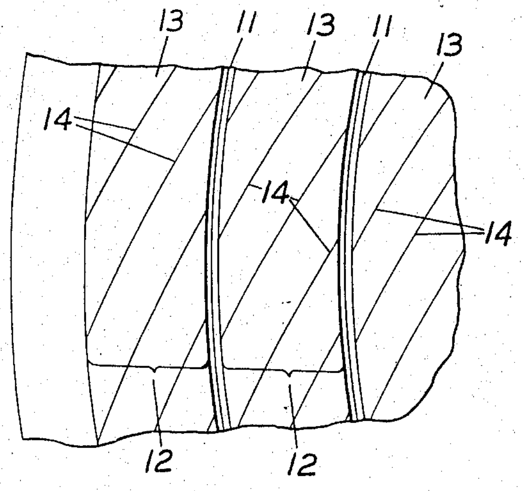
FIG. 2 is a plan view of FIG. 1.

Referring to FIGS. 1 and 2 of the drawings, the record disc 10 has on each side a spiral groove 11, which affords a sound track and guide for a pick-up, and immediately alongside and between the turns of said groove 11 a flat spiral land 12 having a coating of photographic emulsion 13, which emulsion coated land 12 constitutes the video track.

In order to obtain a reasonably long play back time of the sound and accompanying visual display material from a standard size record disc, it is necessary to accommodate the video content on a narrow track, say for example, only one millimeter wide. In this connection, the total number of separate picture elements required for good 405 line definition is over 120,000 per frame for normal display in the ratio of 4:3 width to height, and this number of elements must be available within the space taken up by the equivalent of a single frame or complete image in the narrow and comparatively long video content area of the disc's video track 12. Using modern photographic coatings, this number of picture elements is, in fact, available. However, it will be appreciated that if an attempt were made to extend the height of a pictorially linear 4:3 frame image, and at the same time to reduce the width drastically, so that said image could be transferred by simple size reduction to the narrow video track 12, a completely unacceptable and serious loss of horizontal definition would result, whereas in the vertical plane far more definition than is required, to a ridiculous extent, would be available. Since a flying spot pick-up must scan within the limits of the narrow "land" track 12 the scan has to be made non-linear, or distorted obliquely of the said track 12, as indicated by the lines 14 in FIG. 2, and the 4:3 frame image has to be correspondingly distorted so that maximum use is made of all available picture elements and equally good definition in both the vertical and horizontal planes will be obtained.

A flying spot scanner must be able, on reproduction of the rotating disc, to pick-off or scan the maximum number of available picture elements, displaying them in a linear fashion; therefore, if it is necessary, as established, to arrange a distorted image in order to cover the maximum or required number of picture elements, it follows that the scan being used must be distorted or arranged in a similar fashion in order that the scanned image can appear pictorially linear, the one relative to the other. The pick-up scan, being electronically coupled to the display system, is synchronised with it in speed, but the display scan presents a linear appearance. The video image superimposed, or modulated on it, therefore also presents a linear appearance and displays an accurate reproduction of the original 4:3 frame. It is possible in this way to exploit to the full the capabilities of modern photographic emulsion giving more than adequate definition on 405 or 625 line displays.

Figure 3:
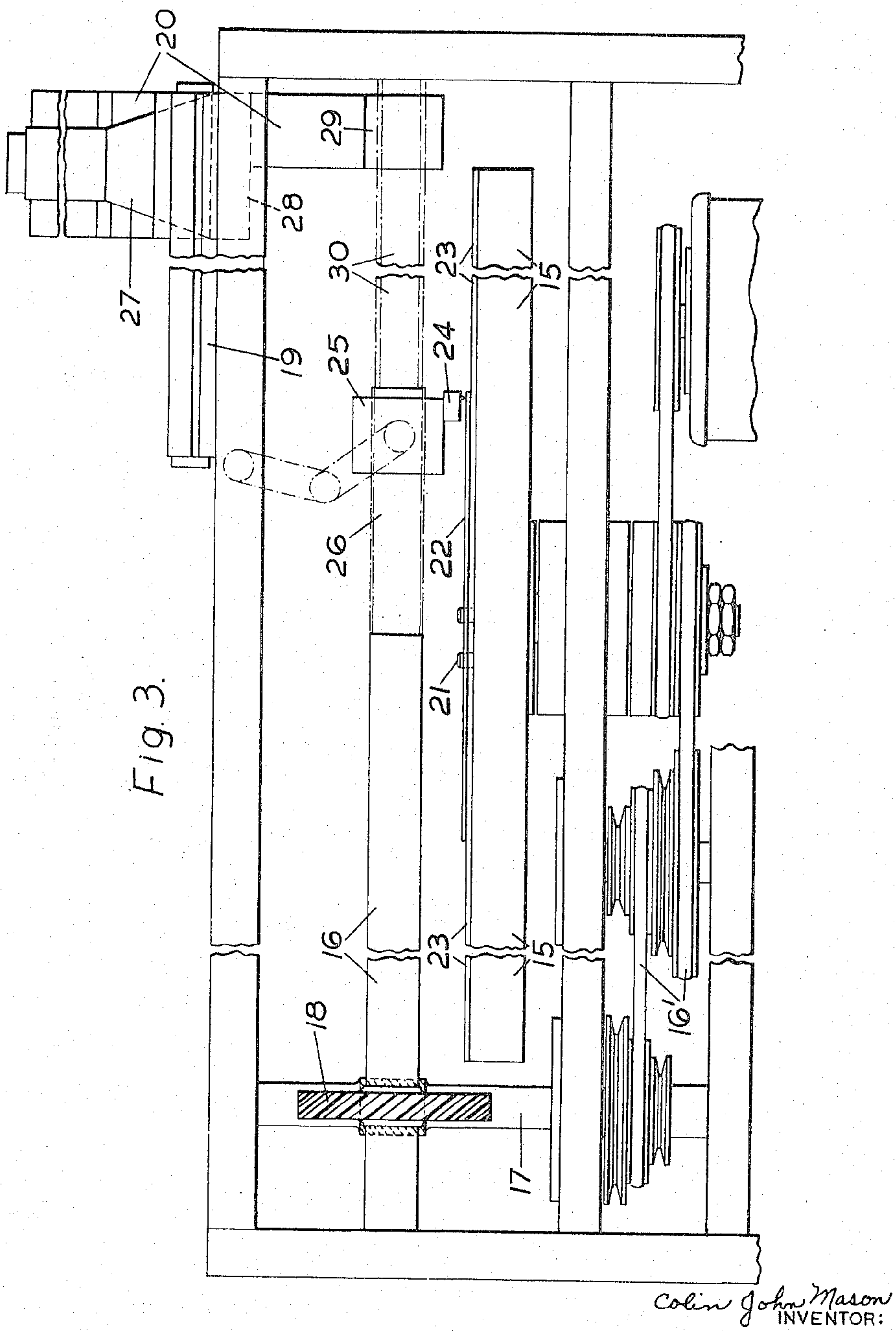
FIG. 3 is a fragmentary elevation of apparatus for producing simultaneously on the same turntable two separate master record discs one of the sound content and the other of the video content of live programme material, from which master discs can be produced, standard size record discs carrying both the sound track and the video track in interlaced and synchronised relationship.

Referring now to FIG. 3 of the drawings, the apparatus comprises a large, motor-driven turntable 15, a horizontal traversing screw 16 driven from the turntable 15 through belt and pulley reduction gearing 16', worm shaft 17 and wormwheel 18, a horizontal guidway 19 parallel to said screw 16, a carriage 20 slidably supported by said guideway. Mounted concentrically upon the turntable 15 and located against relative rotation thereon by a locating pin 21 are two blank record discs 22, 23 one directly upon the other, the upper disc 22 being a standard size, say 12" diameter, and the lower disc 23 being a multiple of that size, say 48" diameter. In recording the sound content of the live material, a sound track in the form of a spiral groove 11 (FIG. 1) is cut in the upper face of the disc 22 by a tool 24, carried by a nut 25 on a threaded portion 26 of the screw 16, as in the manner of cutting a sound track in an ordinary gramophone record disc except that the pitch of the spiral groove 11 is such as to leave between the turns a spiral flat land surface of the requisite width for a video track. Simultaneously with the cutting of the sound track on the smaller or master sound disc 22, the video content of the live material is recorded photographically upon the larger master disc 23 which conveniently is in the form of a thin transparency with its upper surface coated with an appropriate photographic emulsion, an electrically-scanning type video camera 27 and associated focussing lens 28 used, these being mounted on the carriage 20. The latter is traversed by a nut 29 on a threaded portion 30 of the screw 16, the pitch of this screw thread being appropriately greater than that of the thread on the portion 26.

Production copies of the standard size master sound disc can be produced therefrom by conventional methods used in the gramophone record industry, and each such copy is then coated with an appropriate photographic emulsion ready to receive the video material on the spiral land 12 between the turns of the sound track groove 11. In this connection, the vision recording on the larger master record disc 23 is "image reduced" to the size of the standard size of each production disc by means of a conventional camera system and this reduced video track is then printed on said production disc in synchronised and interlaced relationship with the sound track thereon, normal photographic methods being used for this purpose. The small size of the photographic image content required on the standard size production discs in such that excessive losses in definition would result if the video track were to be scanned directly on to such disc and it is to avoid or very materially reduce such losses that the video track is first scanned, to a large scale, on to a large master disc 23 and then "image reduced" photographically to the required size and transferred by photographic processes to the emulsion coated production discs already carrying the sound track copied from the standard size master disc 22.

Referring now to FIGS. 4 and 5, the record player deck and pick up unit comprises a motor driven turntable 31, for the standard size production disc, a tubular pick up arm 32 which is mounted at its one end for movement about a vertical pivot 33 and for vertical movement about a horizontal pivot 34, and, mounted on the deck in a horizontal disposition, a flying spot type pick up tube 35 with its scan coils 36 and focussing coils 37. The free or opposite end of the tubular pick up arm 32 carries a stylus 38 and associated pick up cartridge 39 for picking off the sound track content, and the distorted pictorial image which forms the recorded video track is illuminated by an electric light bulb 40 and, by means of a simple lens 41 and appropriately inclined mirrors 42, 43 is focussed on to the face of the pick up tube 35. The resultant image is scanned off by the photo-electric flying spot, the action being similar to that of a television camera except that line scan only is required and in view of this it is conceviably possible that a much smaller pick up tube unit 35 could be produced to fit into the pick up arm 32 as illustrated in FIG. 6 of the drawings in which like reference numbers to those used in FIGS. 4 and 5 indicate like or analogous parts.

In order to ensure the presentation of a locked and linear display from the video content recorded on the disc, it is necessary to synchronise the effective movement of the scanning circuits of the video display system with the rotary movement of the disc in relation to the pick-up unit, and, to this end, use is made of a constant waveform or pulse train which is present either on a recorded track on the disc itself, or mechanically or magnetically coupled to the disc in such a way that on rotation of the disc, the phase shift of these pulses is directly proportional to any variation in constancy of disc movement, whilst the frequency of the pulse is directly proportional to the speed of disc movement. Recording and pick-up of said pulse train may be by mechanical, photoelectric or magnetic means, the resultant output by any of these methods being basically the same. In addition to this pulse train or waveform, a second pulse train or waveform is required, this second one being much lower in frequency than the first and having in fact an exact repetition frequency equal to the recorded video image repetition frequency, which is approximately fifty frames per second. This is used ultimately to cut off the rising voltage of a "staircase" network produced by the first higher frequency pulse train, so producing a sawtooth waveform. This sawtooth waveform, therefore, being produced by two other waveforms, each having a variation in phase and frequency, will itself vary in linearity and repetition frequency, and this variation will conform exactly and in direct proportion to the original variation of the first two waveforms. It is this sawtooth waveform which is then used to drive a frame output stage, which in turn provides the video display frame scanning time base.

If the motor and turntable for driving the record disc have an extremely constant speed, it may be possible to dispense with said first waveform and to use only the second of the original two waveforms, i.e. fifty frames per second, and with these conditions it is necessary only to use a square pulse produced from this waveform to synchronise the display frame time base with each successive recorded frame image as it passes the point of pick-up. In the case of a drive system (motor and turntable) running at a reasonably constant speed, no synchronisation control other than the two types outlined above is necessary.

If the disc is reproduced employing, as a means of rotation, a motor and turntable, which develop an unacceptable degree of "wow" and "flutter," a sawtooth waveform would have to be produced which followed exactly the variations in turntable speed, otherwise there would be a variation between the rotary movement of the disc and the effective movement of the frame scanning display waveform. This error would appear as a vertical judder or ripple, and would be unacceptable.

Line time base scanning only is employed in the video pick-up tube, and if therefore both this and the display line scan are driven from one and the same line sawtooth generator, it follows that pick-up and display cannot in this sense drop out of synchronisation. However, in bad cases of non-constancy of disc speed, an accurately conforming frame scan display, being provided by the badly running disc, will lead to uneven spacing of the actual scan lines, although video content will be completely steady and linear. This uneven spacing of lines can lead to an appearance of flicker or ripple, and if this has to be avoided, assuming a badly running motor is employed, it can be done by using a pulse, provided by the higher frequency train on the control track, to synchronise or trigger the joint line sawtooth generator, whichever means is appropriate to the generator in question.

Figure 7:
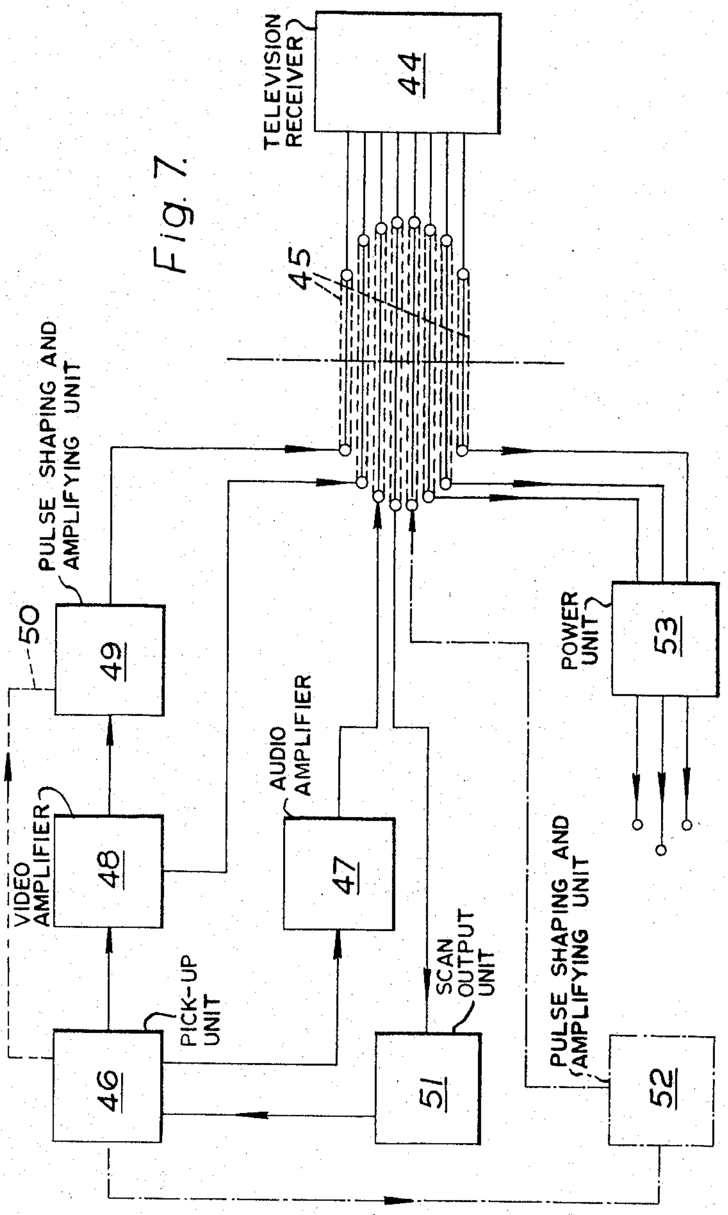
FIG. 7 is a block circuit diagram of the record play back apparatus connected to a domestic television receiver.

Referring now to FIG. 7 showing the block circuit diagram of the play back apparatus connected to a domestic television receiver 44 by a multiple cable flylead 45, the sound signal output from the record player deck and pick-up unit 46 is connected through an audio amplifying and equalising network 47 to the audio frequency output stage of the receiver 44. The video signal and superimposed high and low frequency pulse trains of constant or sine wave form from the unit 46 pass through a video amplifier 48 and the amplified video signal is fed into the video output stage or cathode ray tube of the receiver 44, whilst the pulse trains are fed into a unit 49, comprising synchronising, separator, pulse shaping, frame cut-off and pulse amplifying networks, and the resulting sawtooth or synchronised output from said unit 49 is fed into the receiver 44 so as to drive the frame output stage which provides the scanning time base for the video display. If the turntable motor of the record player deck has a very constant speed, the higher frequency pulse train and the synchronising separator circuits in the unit 49 may be unnecessary, in which event the lower frequency pulse train may be fed directly from unit 46 to unit 49, as indicated by dotted line 50, instead of being superimposed on the video output from unit 46, and the connection between the unit 48 and unit 49 may be omitted, the resulting square pulse output from unit 49 being used alone to synchronise the frame time base with each successive recorded frame image as it passes the point of pick-up.

The line oscillator input for the pick-up scan of the play back unit 46 is derived from the line oscillator stage of the reeciver 44 through a line scan output unit 51.

Where a badly running turntable motor produces uneven spacing of the scan lines, this can be overcome by using the higher frequency pulse train through a line pulse shaper and amplifier unit 52 connected to the line oscillator stages of the receiver 44, as shown in chain-dotted lines, to provide synchronising or trigger pulses to the joint line sawtooth generator.

If the latter method of synchronisation is inadequate, a triggered generator can be built into the player equipment and become the joint drive, the television receiver line oscillator being switched out of circuit and rendered inoperative. Triggering in this way would be used in extreme cases only, and is not necessary when employing a normal modern record player motor and turntable.

A unit 53 supplies power from the receiver 44 for the heaters and high tension requirements of the units 46 to 52 inclusive.

Although it is ideal for the synchronising waveform to be recorded on the disc, this is not essential. It can be produced, by any convenient method of pick-up, from any appropriate object coupled by mechanical or magnetic means to the disc, e.g. a photo-electric pick-up could respond to a light source appearing through a series of holes punched in a circular fashion in a flat, stiff disc of any convenient material, say metal, coupled physically to the turntable by the virtue of being mounted on the same central shaft. If the holes correspond exactly with each frame of video content on the recording, they would produce in the photo-electric pick-up, the desired waveform. A sawtooth waveform could be directly produced in this way by using a slit type photo-electric pick-up system and triangular shaped holes. Magnetic coupling could be used in the above method instead of physically turning the two objects together, i.e. magnetic attraction could be employed, the central shaft remaining stationary, the flat metal disc and rim driven turntable rotated round it being coupled magnetically. Instead of a separate metal disc, the turntable itself could be used, having the holes punched around its rim or on the outer edge of its surface.

In any of these alternatives, the control track could be built into the play-back equipment.

Probably the most practical and space saving method is to record the synchronising pulses in the same groove as the sound track by employing a conventional dual channel "stereophonic" type groove, sound being recorded on the one channel, control on the other. The combined sound and control signal is then separated by the pick-up cartridge, again in a conventional manner. The whole therefore can comprise a multiple track which is capable of reproducing simultaneously, sound, vision and picture locking synchronisation information, and for this purpose a combined mechanical and photo-electric type of pick-up unit is employed.

With regard to the control track alone, conventional circuitry is used for amplification, pulse forming and shaping, after which is available a direct drive to the display scanning circuits, in the form of a sawtooth waveform, or synchronisation (locking) pulses in the form of a square wave. Whichever method is used the principle remains similar, namely the effective movement of the electronic scanning waveforms of the video display system, follows exactly the physical movement of the disc, and consequently of the recorded video content, with relation to its rotatively stationary pick-up unit.

In the "dual pulse train" sawtooth producing method, the degree of accuracy obtainable is directly proportional to the initial means average pulse or waveform repetition frequency, which can be chosen as desired, up to the high frequency limits of whatever system is utilised for recording and pick-up. In the case of a mechanical micro-groove recording, this frequency can be in the order of 10,000 c./s.

Where this frequency is also used for triggering or synchronising a line time base scan, it must have a mean average of a multiple of the line scanning frequency used by the display line stages, e.g. for 405 line television receivers 10,125 c./s., this being normal line frequency for all 405 line displays. This not only gives ample accuracy, but can also be made available for use in pulse form if line synchronisation or triggering is required.

Having fully described my invention, what I claim and desire to secure by Letters Patent is:

1. A record disc of programme material having both sound and video contents, the disc having two concentric spiral tracks, one of said tracks carrying the sound content and the other track carrying the video content in photographically recorded form as a plurality of picture elements arranged in lines which extend, side by side and in spaced apart relation, obliquely across the width of said other track, the spacing between adjacent lines being such that a line extending radially from the centre of the disc will intersect several such lines of elements in each turn of the track, each element having a density corresponding to the light intensity of an elemental area of the video material to be reproduced.

2. A record disc according to claim 1 including a spiral groove to act as a guide for a pick-up device of the video content.

3. A record disc according to claim 1 wherein the disc also has recorded thereon a pulse train or waveform whose repetition frequency is equal to the required repetition frequency of the video image.

4. A record disc according to claim 2 wherein the disc has recorded thereon a second pulse train or waveform having a repetition frequency higher than that of said first mentioned pulse train or waveform.

5. A record disc according to claim 1 including a spiral groove to act as a guide for a pick-up device of the video content, the groove having recorded therein a pulse train or waveform whose repetition frequency is equal to the required repetition frequency of the video image.

6. A record disc according to claim 5 wherein the groove has recorded therein a second pulse train or waveform having a repetition frequency higher than that of said first mentioned pulse train or waveform.

7. A method of making a record disc of programme material having both sound and video contents, the disc having two concentric spiral tracks, one of said tracks carrying the sound content and the other track carrying the video content in photographically recorded form; the method comprising scanning the video material to break it down into a plurality of elemental areas and photographically recording each of said elemental areas as a picture element having a density corresponding to the light intensity of its associated elemental area, the picture elements being recorded in lines which extend side by side and in spaced apart relation, obliquely across the width of said other track, the spacing between adjacent lines being such that a line extending radially from the centre of the disc will intersect several such lines of elements in each turn of the track.

8. A method of making a record disc according to claim 7 comprising recording the sound content on one track on a first master disc and simultaneously photographically recording the video content on another track on a second master disc of greater diameter than that first master disc and driven in synchronism therewith, the sound content being subsequently reproduced on a copy record disc smaller than said second master disc, a reduced image of the video content on the second master disc being photographically reproduced on the copy record disc.

9. A method according to claim 8 wherein both master discs are driven by the same turntable during recording.

References Cited

UNITED STATES PATENTS

| | | | |
|---|---|---|---|
| 1,967,882 | 7/1934 | Hammond | 179—100.3 |
| 3,198,880 | 8/1965 | Toulon | 178—6.7 |

JOHN W. CALDWELL, *Primary Examiner.*

DAVID G. REDINBAUGH, *Examiner.*

H. W. BRITTON, *Assistant Examiner.*